(12) United States Patent
Kuschke et al.

(10) Patent No.: US 8,031,736 B2
(45) Date of Patent: Oct. 4, 2011

(54) APPARATUS AND METHOD FOR COMBINED TRANSMISSION OF INPUT/OUTPUT DATA IN AUTOMATION BUS SYSTEMS

(75) Inventors: Detlev Kuschke, Schieder-Schwalenberg (DE); Juergen Jasperneite, Steinheim (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 450 days.

(21) Appl. No.: 11/443,632

(22) Filed: May 31, 2006

(65) Prior Publication Data

US 2006/0274746 A1 Dec. 7, 2006

(30) Foreign Application Priority Data

Jun. 1, 2005 (DE) .......................... 10 2005 025 582

(51) Int. Cl.
*H04J 3/26* (2006.01)
(52) U.S. Cl. ........ 370/432; 370/259; 370/392; 370/458; 370/546
(58) Field of Classification Search .................. 370/392, 370/458, 259
See application file for complete search history.

(56) References Cited

U.S. PATENT DOCUMENTS

| | | | | |
|---|---|---|---|---|
| 5,754,540 | A * | 5/1998 | Liu et al. ........................ | 370/315 |
| 6,041,058 | A * | 3/2000 | Flanders et al. ............... | 370/401 |
| 6,233,626 | B1 * | 5/2001 | Swales et al. ................... | 710/11 |
| 6,711,698 | B1 * | 3/2004 | Marbach et al. ................. | 714/4 |
| 2005/0088991 | A1 | 4/2005 | Kil | |
| 2005/0132089 | A1 * | 6/2005 | Bodell et al. .................. | 709/249 |

FOREIGN PATENT DOCUMENTS

| | | |
|---|---|---|
| DE | 4100629 C1 | 8/1992 |
| DE | 19851245 A1 | 12/1999 |
| EP | 1191759 A2 | 3/2002 |

OTHER PUBLICATIONS

Beckhoff PCControl "EtherCAT—The Ethernet Fieldbus" Oct. 2003, Issue Mar. 2003.*
Beckhoff PCControl "Real-Time Ethernet: Ultra High Speed right up to the I/O" Jun. 2003, Issue Feb. 2003.*
EtherCAT Technology Group, "EtherCat Technology" Feb. 7, 2004.*
Hausruf Weigt, "German Patent Application No. 10 2005 025 582.5 Office Action", Jul. 15, 2008, Published in: DE.
German Patent Office, "German Office Action for German International Application No. 10 2005 025 582.5 dated Nov. 26, 2010",Publisher: German Patent Office, Published in: DE.

* cited by examiner

*Primary Examiner* — Dang Ton
*Assistant Examiner* — Robert M Morlan
(74) *Attorney, Agent, or Firm* — DeMont & Breyer, LLC

(57) ABSTRACT

An installation is disclosed having a plurality of components which are connected to one another via an Ethernet network, with at least a first of the components having a device for reading data that is intended for that component from a sum frame via a sum frame protocol, as well as a device for reading the sum frame from the data part of an Ethernet MAC frame, with at least one of the components of the installation having a device for embedding the sum frame in the data part of an Ethernet MAC frame, and having a device for transmission of the Ethernet MAC frame via the Ethernet network, and with at least one of the components having a device for insertion of an identifier into the Ethernet MAC frame, which identifier indicates whether the data part of the Ethernet MAC frame contains a sum frame.

32 Claims, 3 Drawing Sheets

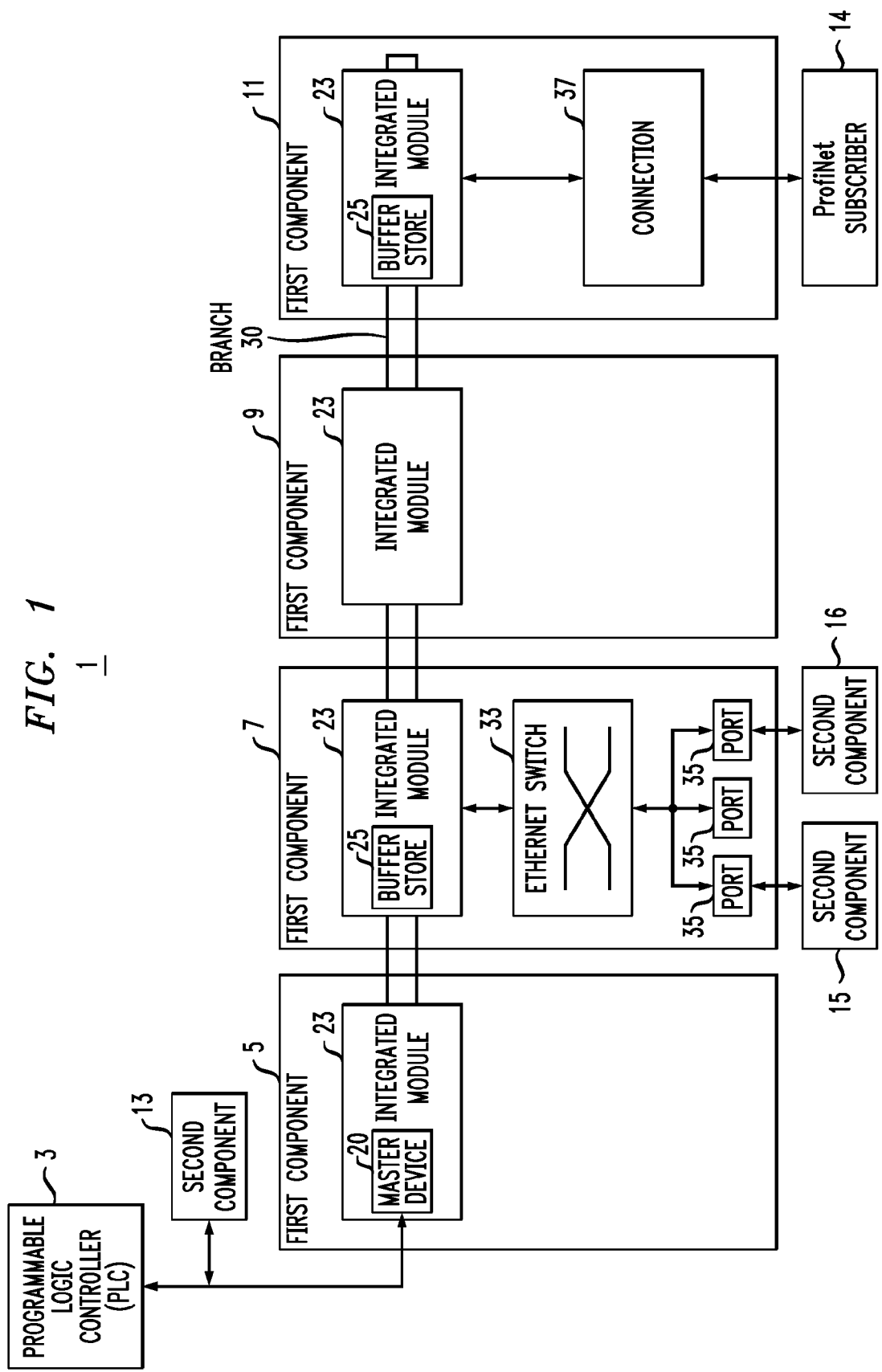

APPARATUS AND METHOD FOR COMBINED TRANSMISSION OF INPUT/OUTPUT DATA IN AUTOMATION BUS SYSTEMS

The invention relates in general to automation systems, in particular to data transmission in systems such as these.

Various transmission protocols for automation systems are generally known from the prior art. These include, inter alia, the ProfiNet system and fieldbus systems, such as the Interbus system. These widely used bus systems are in this case increasingly replacing proprietary solutions for process automation. However, it is desirable to improve the compatibility between the various systems and to allow their advantages to be combined with one another. Fieldbus systems generally operate at transmission rates of less than 10 Mbit/s. On the other hand, the protocols that are used are highly effective, with a real-time capability. In contrast, Ethernet systems, which also include the ProfiNet system, frequently operate at higher transmission rates.

In this context, DE 198 51 245 A1 discloses a fieldbus component, a communication system and a method which allow fieldbus components to be combined with high-speed data transmission, such as the Ethernet. A fieldbus component is provided for this purpose which has a data protection layer (corresponding to layer 2 of the OSI reference model) which processes a fieldbus protocol, and a physical layer (corresponding to layer 1 of the OSI reference model), with the physical layer being designed for high-speed data transmission. The two layers are connected to an interface. In addition, a layer is provided for matching the data protection layer that processes a fieldbus protocol to the physical layer.

In the case of the solution proposed in this prior art, only the physical layer is designed for high-speed transmission. The data protection layer with the medium-access control layer in this case operates on the basis of a fieldbus protocol. Only the physical transmission of the frame data is carried out via a medium for high-speed transmission. However, in this form, the system also does not allow any integration of other network components, since the individual fieldbus components cannot distinguish whether the transmitted data is or is not data according to a fieldbus protocol.

In contrast, the invention is based on the object of improving the mutual integration of components, which control or are controlled via a fieldbus protocol, with other components which can be networked using an Ethernet network.

This object has already been achieved in a very highly surprisingly simple manner by the subject matter of the independent claims. Advantageous developments and refinements of the invention are specified in the dependent claims.

In this context, the invention provides an installation having a plurality of components which are connected to one another via an Ethernet network, with at least a first of the components having a device for reading data that is intended for that component from a sum frame by means of a sum frame protocol, as well as a device for reading the sum frame from the data part of an Ethernet MAC frame, with at least one of the components of the installation having a device for embedding the sum frame in the data part of an Ethernet MAC frame, and having a device for transmission of the Ethernet MAC frame via the Ethernet network, and with at least one of the components having a device for insertion of an identifier into the Ethernet MAC frame, which identifier indicates whether the data part of the Ethernet MAC frame contains a sum frame. An installation such as this in this case preferably comprises an automated manufacturing installation, although this does not preclude the possibility of the invention also being used for other control processes.

A method according to the invention for data transmission in an installation having a plurality of components which are connected to one another via an Ethernet network, in particular in an installation according to the invention, in particular also for controlling an automated manufacturing process, is based on a sum frame being produced, the sum frame being embedded in the data part of an Ethernet MAC frame and an identifier being inserted, in that the Ethernet MAC frame contains a sum frame for processing according to a fieldbus protocol, with the Ethernet MAC frame then being transmitted as a message via the Ethernet network, and data which is intended for at least one first component which is designed to process data according to a fieldbus protocol being read from a sum frame according to a sum frame protocol from the sum frame in the Ethernet MAC frame component in response to finding that the identifier is present.

The invention thus allows high-speed sensor/actuator communication, as is typical for many fieldbus protocols, to be combined with the standard Ethernet on one transmission medium. This thus also allows control of time-critical processes when using Ethernet as the transmission medium. Furthermore, it is possible to use a common installation concept for fieldbus and Ethernet systems.

In one preferred development of the invention, one of the components comprises a head station with a master unit for controlling the bus traffic with the at least one component, which head station has a device for reading data that is intended for that component from a sum frame by means of a sum frame protocol. A communication procedure which is typical of many types of fieldbus can advantageously be implemented by the control of the bus traffic by the at least one component which is designed to process data according to a fieldbus protocol, and by the master unit in the head station. In particular, in this case, a sum frame can also be produced with control data in the head station with the master unit, can be embedded in the data part of an Ethernet MAC frame, and the Ethernet MAC frame can be transmitted via the Ethernet network to the at least one component which is designed to process data according to a fieldbus protocol.

In particular, according to the invention, a plurality of components, preferably all of the components, can be controlled by a device for reading data that is intended for that component from a sum frame by means of a sum frame protocol via data in a common sum frame. In order to implement this development of the invention, the device for embedding the sum frame in the data part of an Ethernet MAC frame is accordingly designed to embed a common sum frame for a plurality of components, in particular for all of the components, with a device for reading data that is intended for that component from a sum frame by means of a sum frame protocol.

Furthermore, one or more components may also be provided for insertion of data into the sum frame, for example sensor components. These components, which are then likewise designed to process data according to a fieldbus protocol, can insert data that is intended for a further component into the sum frame in the Ethernet MAC frame in response to finding that the identifier is present on reception of an Ethernet MAC frame.

The identifier is particularly preferably inserted into the header by means of a device which is designed appropriately for this purpose. This means that there is particularly advantageously no need at all to read the data part of the frame in order to make it possible to find out whether the frame contains sum frame data.

The Ethernet MAC frames are preferably processed in the first component or components using a switch device. In response to finding that the identifier indicates the presence of sum frame data in the Ethernet MAC frame, this switch device can then supply the sum frame data to the device for reading data that is intended for that component from the sum frame. If a different identifier is present, then, in response to finding that the identifier indicates the absence of sum frame data in the Ethernet MAC data, then the switch device can particularly advantageously cause the data to bypass the device for reading data that is intended for that component from the sum frame.

Furthermore, other identifiers can also be provided in order to control the data traffic. By way of example, another advantageous development provides that, in response to finding that the identifier indicates the absence of sum frame data in the Ethernet MAC frame, but does indicate the definition of the frame data for this component, the switch device supplies the data to a further internal processing device for the component.

The invention results in complete integration of first components for the processing of sum frame data in an Ethernet network. This then also means that it is particularly advantageously possible to include other components. For this purpose, according to a further embodiment of the invention, at least one second component is provided, is connected via the Ethernet network and is designed to process data that is intended for that component from an Ethernet MAC frame by means of a protocol which is not the same as the sum frame protocol. A component such as this may, for example, be a component for processing data according to the ProfiNet protocol, which is likewise frequently used in process automation. If, in addition, messages are sent which do not contain any sum frame data, that is to say by way of example data for processing according to the ProfiNet protocol, then at least one first component can also be in the form of a repeater for messages such as these.

Sum frame protocols, such as the Interbus protocol, are particularly suitable for transmission and processing of time-critical data. In order to ensure correct transmission and reception of the sum frame data at its destination when the sum frame is being transmitted according to the invention in an Ethernet MAC frame, the aim of yet another development of the invention is to configure the components such that messages with sum frames contained in the Ethernet MAC frame and other messages are transmitted in successive time slots of predetermined length.

Alternatively or additionally, the components can also be configured such that a predetermined sequence of messages with sum frames embedded in the Ethernet MAC frame and other messages is included. For example, a message with different contents can in each case be transmitted for this purpose after a message with sum frames embedded in the Ethernet MAC frame. It is likewise possible to provide for a message with different contents to be sent in each case only after a predetermined number of messages with sum frames which are embedded in the Ethernet MAC frame.

It is likewise advantageous for the processing of time-critical data if simultaneous data protection is provided by a plurality of first components, in particular by all of the first components, which process data from the sum frame after transmission of a message with sum frames contained in the Ethernet MAC frame.

This can be achieved in a simple manner by means of an evaluation circuit and an additional circuit device in the form of a changeover switch. For this purpose, a plurality of first components are connected to the Ethernet network, with the components having a changeover switch by means of which their shift registers are bridged and an identification circuit can be connected to the transmission line and identifies a control signal, with data protection being provided by the component in response to the control signal. This development of the invention then allows data to be processed at times which can be predetermined accurately in the same way, for example, as in an Interbus system.

In addition, the data is advantageously not transmitted to the first components at undefined times, in order to avoid collisions with other messages. In this context, one development of the invention provides that first components which are also used to transmit data, in particular to a component with a master device, have a buffer store which collects the data, in particular the Ethernet messages themselves. The Ethernet messages can then advantageously be transmitted after transmission of the message with the sum frame.

The processing of the data in the first components, including the reading of the data intended for those components from the sum frame, is particularly preferably carried out by means of an integrated module. In this context, it is also within the scope of the invention to specify a module such as this. An integrated module according to the invention, in particular for a first component of an installation as described above, accordingly comprises a device for reading data that is intended for that component from a sum frame by means of a sum frame protocol, a device for reading the sum frame from the data part of an Ethernet MAC frame, and a device for evaluation of an identifier in the Ethernet MAC frame, which indicates whether the data part of the Ethernet MAC frame contains a sum frame, with the circuit of the module being designed to read the data that is intended for that component in response to the presence of the identifier, and to make this data available at at least one output of the module.

A first component according to the invention which, in particular, is equipped with a module such as this and/or is designed to carry out the method according to the invention, for an installation such as this accordingly comprises a device for reading data that is intended for that component from a sum frame by means of a sum frame protocol, a device for reading the sum frame from the data part of an Ethernet MAC frame, and a device for evaluation of an identifier in the Ethernet MAC frame which indicates whether the data part of the Ethernet MAC frame contains a sum frame, with the component being designed to read the data that is intended for that component in response to the presence of the identifier, and to process this data.

According to the invention, as is normal in the case of an Interbus system by way of example, the first components can be networked with one another in the form of a ring in order also to allow data processing to be carried out in accordance with the Interbus protocol, when using Ethernet frames.

In particular, the installation may comprise at least one I/O station with a plurality of first components, with data being transmitted to the first components of the I/O station in messages which each have one sum frame which contains the data of a bus cycle for the first components. The I/O station, or a plurality of such I/O stations as well, can advantageously be controlled by means of a programmable logic controller.

The invention will be explained in more detail in the following text using exemplary embodiments and with reference to the attached drawings. In this case, the same reference symbols denote identical or similar parts and devices. In the figures:

FIG. 1 shows the design of one exemplary embodiment of an installation according to the invention, as a block diagram.

FIG. 1 shows one example of a system design for an installation which is denoted by the reference symbol 1 overall. This installation may, in particular, comprise an automated manufacturing installation.

Figures 2A, 2B:
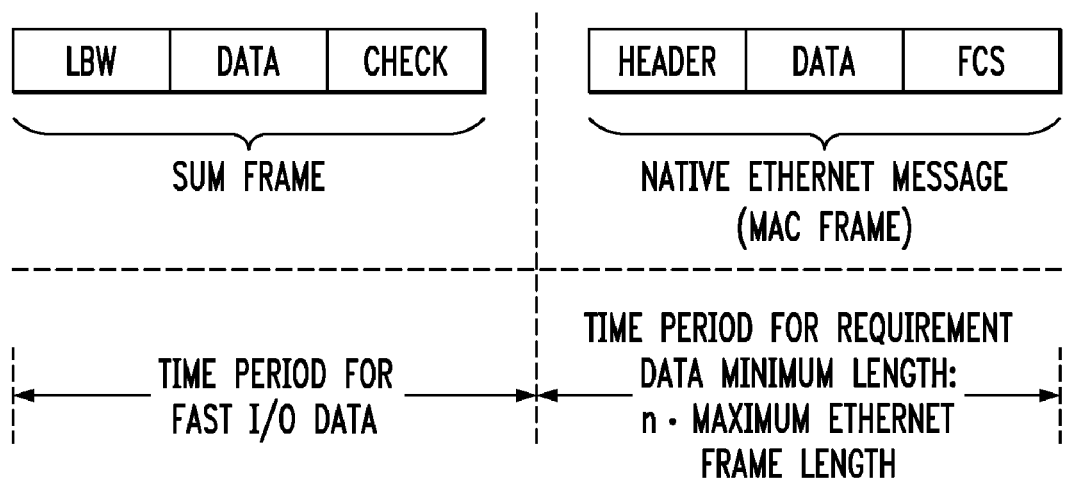
FIG. 2A shows the layout of the sum frames that are transmitted.
FIG. 2B shows the layout of an Ethernet message.

Stations according to the invention, of which one station 2 is illustrated in FIG. 1, are located at a standard PLC 3, connected to one another, for example, via an Ethernet protocol, such as the ProfiNet protocol, which uses a transmission rate of 100 Mbd. The stations are formed by the interconnection of a plurality of components 5, 7, 9, 11, and together form an I/O station. The I/O station 2 essentially contains a head station 5 and a plurality of further individual components 7, 9, 11. By way of example, the connection between the individual components forms a suitable physical layer with a data transmission rate of, for example, 1 Gbd. In this case, the components 5, 7, 9, 11 are networked with one another in the form of a ring via a branch 30 of the Ethernet network.

The head station 5 itself contains a master device 20, which controls the bus traffic to the further downstream first components 7, 9, 11. In this case, standard Ethernet MAC frames are used. A sum frame protocol is used for efficient communication between the individual components with time-critical I/O data, based on the Ethernet transmission layer, and thus ensuring efficient data interchange between the individual components 5, 7, 9, 11. The installation accordingly comprises a plurality of components 5, 7, 9, 11 which are connected to one another via an Ethernet network. In addition, the components 5, 7, 9, 11 have a device for reading the sum frame from the data part of an Ethernet MAC frame in the form of protocol chips, or integrated modules 23, with the integrated module 23 for the head station 5 at the same time acting as the master device 20. Apart from this, the components 5, 7, 9, 11 are designed in a corresponding manner to conventional Interbus components and, in a corresponding manner for this purpose, also have a device that is not illustrated for reading data that is intended for that component from a sum frame by means of a sum frame protocol. At least the head station 5, or its protocol chip 23 that is configured as the master device 20, is also designed to embed the sum frame in the data part of the Ethernet MAC frame to be transmitted.

In order that the integrated modules 23 in the first components 5, 7, 9, 11 are in each case able to distinguish between a message with an Ethernet MAC frame such as this and with an embedded sum frame from other, conventional Ethernet messages, an identifier is inserted into the header of the Ethernet MAC frame, which indicates whether the data part of the Ethernet MAC frame contains a sum frame.

One or more of the first individual components 5, 7, 9, 11 for processing time-critical I/O data may, for example, have an integrated Ethernet switch 33. In the example illustrated in FIG. 2, the component 7 is equipped with a switch 33 such as this. The switch 33 provides ports or connecting points 35 for the connection of second components 15, 16, which are designed to process data that is intended for that component from an Ethernet MAC frame by means of a protocol which is not the same as the sum frame protocol.

In the example shown in FIG. 1, the second components 15, 16 are Ethernet appliances. The component 7 directly outputs and inputs the Ethernet MAC frames that are used. The appliances 15, 16 to be connected may, for example, be appliances using the ProfiNet protocol, or other Ethernet appliances using a different protocol.

A further type of individual components offers an already integrated connection capability especially, for example, for ProfiNet appliances. As is illustrated in FIG. 1, the component 11 in this example is equipped in this way, and has a connection 37 for a ProfiNet subscriber 14. A further second component 13, which is designed to process data that is intended for that component from an Ethernet MAC frame by means of a protocol that is not the same as the sum frame protocol, is connected in the example illustrated in FIG. 1 between the programmable logic controller 3 and the I/O station 2. By way of example, this component may also be a ProfiNet subscriber.

Two different message structures are used on the basis of the teaching according to the invention in order to make it possible to satisfy different application requirements.

Figure 3:
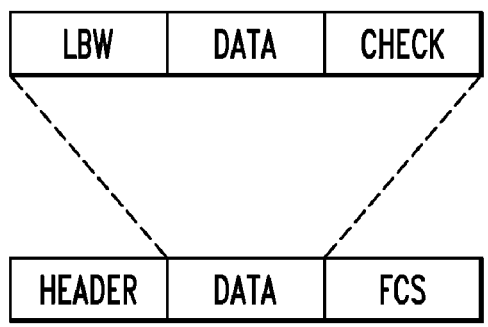
FIG. 3 shows the integration of the sum frame in the data area of the Ethernet MAC frame that is used.

The structure of the various frames which are used is illustrated in FIGS. 2A, 2B and 3.

The data for the individual components 7, 9, 11 with time-critical I/O data is located, in the normal way in the Interbus system, in a single sum frame (FIG. 2A), which is embedded in the standard Ethernet MAC frames that are used. In this case, FIG. 2B shows the layout of a message with a standard MAC frame.

Because of the requirement to have the capability to transmit two different protocols in a common network and to use standard Ethernet MAC frames for this purpose, the sum frame message is inserted into the data area of the Ethernet message (FIG. 3).

The sum frame protocol with a sum frame as shown in FIG. 2A is used predominantly for transmission of time-critical application data, for example from the sensors to the programmable logic controller 3, and/or from the programmable logic controller 3 to the actuators. This transmission protocol is described, for example, in DE 4100629 and is predominantly used in Interbus systems. In the past, this protocol has been proven in particular for high-speed data transmissions. The subject matter of DE 4100629 relating to this is expressly also included in the subject matter of the present invention.

Suitable sum frame protocols are also known from IEC 61158 and IEC 61784.

The method according to the invention makes use of the advantages of the sum frame protocol, in that it includes the time-critical I/O data of all the individual components 5, 7, 9, 11 and transmits them using a single message, with a low overhead. The sum frame message is illustrated in FIG. 3, is embedded in the Ethernet MAC frame, and is transmitted using a suitable physical layer.

Relatively large amounts of data are generally transmitted from and to Ethernet appliances, such as the components 13-16. In addition, for compatibility reasons, the appliances must be able to communicate with one another via a selected Ethernet protocol, such as ProfiNet. Standard Ethernet frames are used for this purpose.

The time-critical I/O data is normally intended to be transmitted cyclically, in order, for example, to allow control operations which require a fixed sampling frame. The data of the ProfiNet subscribers should as far as possible not influence the transmission of the I/O data, or should influence it only to a minor extent. Furthermore, the requirements for equidistant sampling are not as stringent as in the case of time-critical I/O data.

In order to distinguish whether a sum frame message as shown in FIG. 3 or a standard Ethernet message is located in the data field of the Ethernet MAC frame, the message type is evaluated when the message arrives in the individual components. Different message types are defined by means of a fixed identifier in the header of the Ethernet MAC frame. At least three message types may preferably be used:
1. Messages with sum frames
2. Messages without sum frames (Ethernet, ProfiNet, . . . )
3. Messages without sum frames for one of the first components 5, 7, 9, 11 as the receiving subscriber In the case of the identifier 1, the data area of the Ethernet MAC frame contains the time-critical I/O data of all relevant connected individual components in the form of a sum frame message. The bits of the individual components are transmitted directly successively, as in Interbus. With the exception of the MAC frames that are used and physical layers, the data is transmitted in the same way as in the Interbus system, which is known per se.

In the case of the identifiers 2 and 3, the subscriber identifies that this is a pure Ethernet message (for example ProfiNet).

The message is evaluated only by the type 2 or 3 subscribers and is passed around the first individual components, with exclusively time-critical I/O data.

In order to achieve this, the first components 5, 7, 9, 11 have a switch device which, in response to the identifier indicating the absence of sum frame data in the Ethernet MAC frame, causes the data to bypass the device for reading data that is intended for that component from the sum frame.

Figure 4:
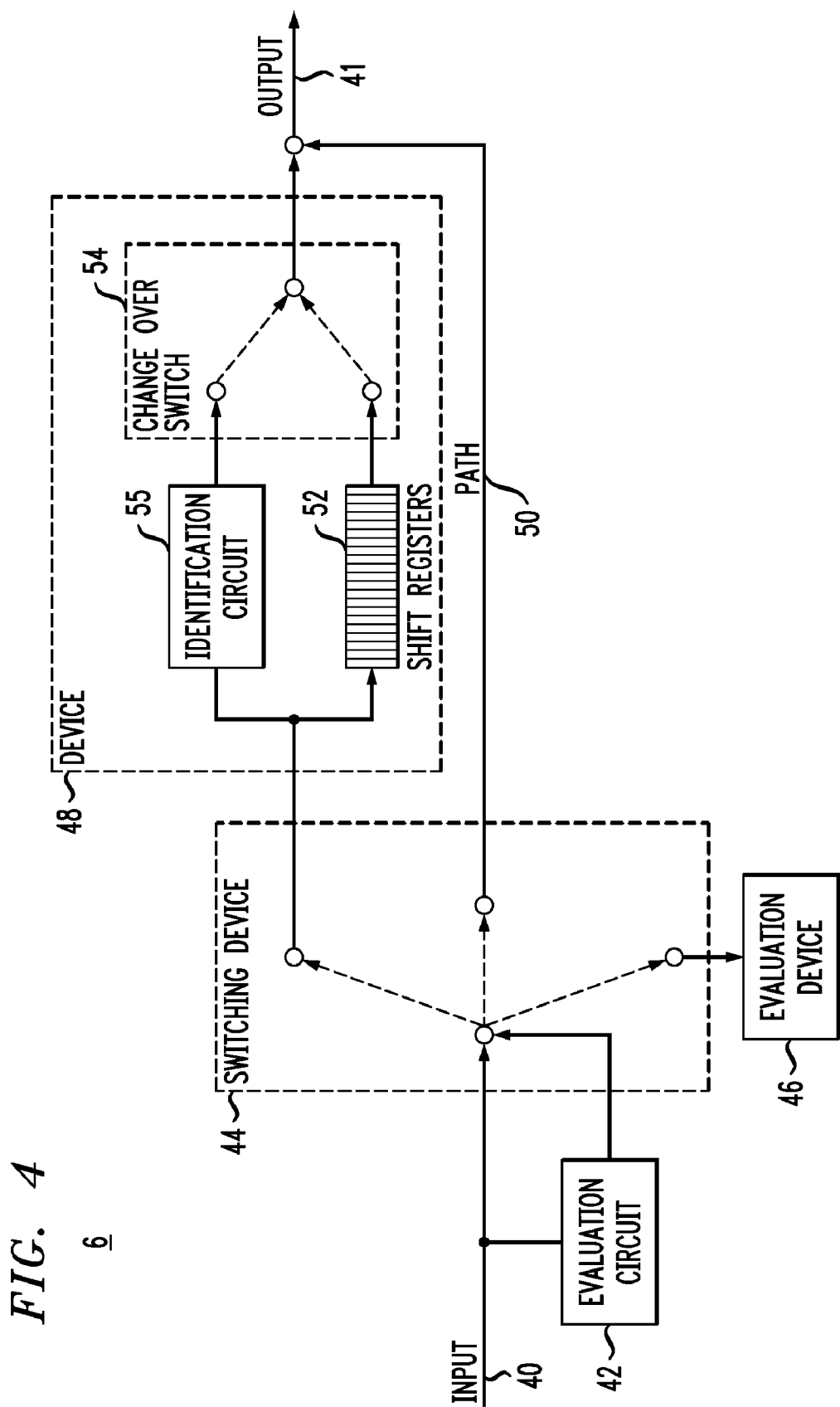
FIG. 4 shows the design of a component in the installation.

In this context, FIG. 4 shows the design of a first component, which is annotated as an entity by the reference symbol 6, as can be used as one of the components 7, 9, 11 in the system illustrated in FIG. 1.

A switching device 44 is used in the data path in order to bypass the device 48 for reading. For this purpose, an evaluation circuit 42 is connected to the input 40 of the first component 6 and evaluates the possible identifiers in the header of the arriving Ethernet MAC frame. If an identifier is found which indicates the presence of sum frame data in the Ethernet MAC frame, then, in response to this, the switching device 44 is set such that the sum frame data is supplied to a device 48 for reading data that is intended for that component from the sum frame. Thus, when the header of an Ethernet MAC frame arrives in the individual component 6, an evaluation circuit identifies whether there is or is not a sum frame protocol in the data area.

This device 48 has a shift register 52, as is normal in Interbus components. In the case of a sum frame protocol, the data in the data area is processed in the same way as in the Interbus system. The relevant individual components receive the data bits of the time-critical I/O data directly successively, and accept them after completion of the sum frame and activation of the master device in the head station. At the same time, new data is also prepared for transmission, and is transmitted in the next cycle.

In particular, the device 48 in the first components has a changeover switch 54. The changeover switch 54 is used to bridge the shift registers 52 in the first components 6. When the shift register 52 is bridged, the changeover switch 54 also connects an identification circuit 55 to the transmission line, which identifies a control signal, with data protection being carried out by the component in response to the control signal. This results in simultaneous data protection being achieved in a plurality of components 6 designed in this way, since the control signal is identified at the same time by all of the evaluation circuits 55 in the components.

In a further switch position, the incoming messages are supplied to the relevant individual component 6 of an evaluation device 46, and are evaluated. By way of example, configuration data can be supplied to the first component 6 in this way.

If this is a pure Ethernet frame, then this frame is passed, in a further switch position, along the path 50 around processing devices of the subscribers with, in particular, time-critical I/O data, for example around the first components 6, directly to the output 41. In a corresponding manner, in response to the identifier indicating the absence of sum frame data in the Ethernet MAC frame, the switch device 44 causes the data to bypass the device 48 for reading data that is intended for that component 6 from the sum frame.

In the phase in which the switch bridges the individual components with pure time-critical I/O data, the only individual components which are thus still addressed are those which are of type 2 or 3, thus considerably reducing the data traffic.

Furthermore, the invention provides for, for example, time splitting of the message types. The length of the sum frame and the time that is required for its transmission can be calculated and are constant. Once the sum frame has been transmitted, this is followed by transmission of the Ethernet messages. For this purpose, the user can provide a time frame in the head station 5 by configuration, which time frame is at least as long as the time which is required for transmission of the longest possible Ethernet message.

Since the transmission rate within the station can be considerably higher than that between the PLC 3 and the head station 5, an integer multiple n of the time which is required for the transmission of an Ethernet message of the maximum length can also be set, from the time aspect point of view, provided that an adequate system reserve is available. In this development of the invention, the components of the installation 1 are accordingly configured such that messages with sum frames contained in the Ethernet MAC frame and other messages are transmitted in successive time slots of predetermined length.

If the connected Ethernet appliances themselves wish to transmit data, then they cannot do so at any undefined time, if it is intended to avoid collisions, since it is necessary to wait for the end of the sum frame. For this purpose, a buffer store 25 is provided in the individual components 7 and 11 in the example shown in FIG. 1 and collects data to be transmitted, with the components 7, 11 being designed to transmit the collected data after transmission of the message which contains the sum frame. In particular, the buffer store 25 can for this purpose collect and temporarily store not only the data but additionally the Ethernet messages to be transmitted.

According to another development of the invention, the first components 5, 7, 9, 11 may be in the form of repeaters for messages which contain no sum frame data. When sum frames are transmitted, the individual components 5, 7, 9, 11 then operate in the same way as in the known Interbus system, but act as repeaters when other Ethernet messages are transmitted that are not intended for those components themselves. In both cases, the standardized Ethernet layer 2 is used. The second switch is used for high-speed relaying of Ethernet messages in the phase which follows the transmission of the sum frame. In this way, the Ethernet messages are passed only to the type 2 and 3 individual components for evaluation.

Furthermore, the system can be configured such that the transmission of a sum frame message is followed by one or more Ethernet messages, or such that Ethernet messages are transmitted, for example, only after every x-th sum frame message. In this embodiment of the invention, the components are accordingly configured in such a way that a predetermined sequence of messages with sum frames embedded in the Ethernet MAC frame and other messages is complied with.

In order to achieve high-speed, error-proof data transmission between the first components 5, 7, 9, 11, these individual components can be installed directly one behind the other. However, it is also possible to provide data transmission that can bridge a greater distance between two individual components. Furthermore, it is particularly preferable to maintain a pure point-to-point transmission between the individual components. Other Ethernet subscribers, for example second components 13-16 should therefore not be connected directly between the first individual components 5, 7, 9, 11 that are connected in this way.

Finally, it should be mentioned that the method is also suitable for the transmission of safety-relevant or security-relevant data. When a sum frame message is transmitted, this may be the Interbus safety protocol or else, when using ProfiNet subscribers, the Profisafe protocol.

As is obvious to a person skilled in the art, the invention is not restricted to the exemplary embodiments described above but, in fact, can be varied in many ways. In particular, the features of the individual exemplary embodiments can also be combined with one another.

The invention claimed is:

1. An installation having: a plurality of components that are connected to one another via an Ethernet network, with at least a first component in the plurality having a device for reading data that are intended for that component from a sum frame by means of a sum frame protocol; and
   a device for reading the sum frame from the data part of an Ethernet Media Access Control (MAC) frame, with at least one of the components in the plurality having a device for embedding the sum frame in the data part of the Ethernet MAC frame, and having a device for transmission of the Ethernet MAC frame via the Ethernet network, and with at least one of the components in the plurality having a device for insertion of an identifier into the Ethernet Media Access Control (MAC) frame, which identifier indicates whether the data part of the Ethernet MAC frame contains the sum frame;
   wherein an evaluation circuit for evaluating a header of the incoming Ethernet MAC frame with respect to the identifier is connected to the first component; and
   wherein the first component is connected to the Ethernet network, with the first component having a changeover switch by means of which i) shift registers of multiple first components in the plurality are bridged in response to finding that the identifier indicates presence of sum frame data in the Ethernet MAC frame by the evaluation circuit at the same time and ii) an identification circuit for identifying the identifier is connected to a transmission, with data protection being provided at the same time by the first component.

2. The installation as claimed in claim 1, comprising a head station with a master unit for controlling bus traffic with the first component, which head station has a device for reading data that are intended for that component from the sum frame by means of the sum frame protocol.

3. The installation as claimed in claim 1, wherein the device for embedding the sum frame in the data part of an Ethernet MAC frame is configured to embed a common sum frame for the plurality of components, with a device for reading data that are intended for that component from the sum frame by means of the sum frame protocol.

4. The installation as claimed in claim 1, comprising at least one component which is configured for insertion of data into the sum frame in response to finding that the identifier is present.

5. The installation as claimed in claim 1, wherein the device for insertion of an identifier into the Ethernet MAC frame is configured for insertion of the identifier into the header of the Ethernet MAC frame.

6. The installation as claimed in claim 1, comprising at least one second component, which is connected via the Ethernet network and is configured to process data that are intended for that component from the Ethernet MAC frame by means of a protocol which is not the same as the sum frame protocol.

7. The installation as claimed in claim 6, comprising
   at least one second component designed to process data according to the ProfiNet protocol.

8. The installation as claimed in claim 1, wherein at least one first component is in the form of a repeater for messages which contain no sum frame data.

9. The installation as claimed in claim 1, wherein the components are configured such that messages are transmitted with sum frames contained in the Ethernet MAC frame and other messages are transmitted in successive time slots of predetermined length.

10. The installation as claimed in claim 1, wherein the components are configured such that a predetermined sequence of messages with sum frames embedded in the Ethernet MAC frame and other messages is included.

11. The installation as claimed in claim 1, wherein the installation comprises an automated manufacturing installation.

12. The installation as claimed in claim 1, wherein at least one first component has a buffer store which collects data to be transmitted, with the component being configured to transmit the collected data after transmission of the message with the sum frame.

13. The installation as claimed in claim 1, wherein the plurality of components are networked with one another in the form of a ring.

14. The installation as claimed in claim 1, wherein the installation comprises at least one I/O station with a plurality of first components, with data being transmitted to the first components of the I/O station in messages which each have one sum frame which contains the data of a bus cycle for the first components.

15. The installation as claimed in claim 1, wherein the plurality of components are combined to form an I/O station which is controlled by a programmable logic controller.

16. The installation as claimed in claim 1, wherein the at least one first component has a switch device which, in response to finding that the identifier indicates the presence of sum frame data in the Ethernet MAC frame, supplies the sum frame data to the device for reading data that are intended for that component from the sum frame.

17. The installation as claimed in claim 16, wherein, in response to finding that the identifier indicates the absence of sum frame data in the Ethernet MAC frame, the switch device causes the data to bypass the device for reading data that are intended for that component from the sum frame.

18. The installation as claimed in claim 16, wherein, in response to finding that the identifier indicates the absence of sum frame data in the Ethernet MAC frame but does indicate the definition of the frame data for these components, the switch device is configured to supply the data to a further internal processing device for the first component.

19. An integrated module for a first component of an installation having a plurality of components that are connected to one another via an Ethernet network the integrated module having:

a device for reading data that are intended for that component from a sum frame by means of a sum frame protocol;

a device for reading the sum frame from the data part of an Ethernet Media Access Control (MAC) frame; and a device for evaluation of an identifier in the Ethernet MAC frame, which indicates whether the data part of the Ethernet MAC frame contains the sum frame, with the circuit of the module being configured to read the data that are intended for that component in response to the identifier being present, and to make this data available at at least one output of the module;

wherein the integrated module is connected to the Ethernet network;

an evaluation circuit for evaluating a header of the incoming Ethernet MAC frame with respect to the identifier being connected to the integrated module, and a changeover switch by means of which i) a shift register of the first component is bridged in response to finding that the identifier indicates presence of sum frame data in the Ethernet MAC frame by the evaluation circuit and ii) an identification circuit is connected to a transmission line to identify the identifier, with data protection being provided at the same time by the integrated module.

20. A first component for an installation having a plurality of components that are connected to one another via an Ethernet network, the first component comprising:

a device for reading data that are intended for the first component from a sum frame by means of a sum frame protocol;

a device for reading the sum frame from the data part of an Ethernet Media Access Control (MAC) frame; and a device for evaluation of an identifier in the Ethernet MAC frame which indicates whether the data part of the Ethernet MAC frame contains the sum frame, with the first component being configured to read the data that are intended for that component in response to the presence of the identifier, and to process this data;

wherein the first component is connected to the Ethernet network; and an evaluation circuit for evaluating a header of the incoming Ethernet MAC frame with respect to the identifier being connected to the first component, and a changeover switch by means of which i) a shift register of the first component is bridged in response to finding that the identifier indicates presence of sum frame data in the Ethernet MAC frame by the evaluation circuit and ii) an identification circuit is connected to a transmission line to identify the identifier, with data protection being provided at the same time by the first component.

21. A method for data transmission in an installation having a plurality of components that are connected to one another via an Ethernet network, the method comprising:

producing a sum frame, the sum frame being embedded in the data part of an Ethernet Media Access Control (MAC) frame;

inserting an identifier which indicates that the Ethernet MAC frame contains the sum frame for processing according to a fieldbus protocol;

transmitting the Ethernet MAC frame as a message via the Ethernet network; and reading data, which are intended for a first component in the plurality of components, from the sum frame in the Ethernet MAC frame according to a sum frame protocol in response to finding that the identifier is present, the first component being designed to process data according to the fieldbus protocol;

wherein an evaluation circuit for evaluating a header of the incoming Ethernet MAC frame with respect to the identifier is connected to the first component; and wherein the first component is connected to the Ethernet network, with the first component having a changeover switch by means of which i) shift registers of multiple first components in the plurality are bridged in response to finding that the identifier indicates presence of sum frame data in the Ethernet MAC frame by the evaluation circuit and ii) an identification circuit for identifying the identifier is connected to a transmission line, wherein after transmission of a message with sum frames which are contained in the Ethernet MAC frame, data protection is provided at the same time by the first component.

22. The method as claimed in claim 21, wherein bus traffic with the at least one component which is configured to process data according to the fieldbus protocol is controlled by a master unit of a head station.

23. The method as claimed in claim 22, wherein a sum frame with control data is produced in the head station with the master unit, is embedded in the data part of an Ethernet MAC frame, and the Ethernet MAC frame is transmitted via the Ethernet network to at least one component which is configured to process data according to the fieldbus protocol.

24. The method as claimed in claim 21, wherein the plurality of first components are controlled by a device for reading data that are intended for that component from the sum frame by means of the sum frame protocol, via data in a common sum frame.

25. The method as claimed in claim 21, wherein data that are intended for a further component is inserted into the sum frame in the Ethernet MAC frame by at least one component which is configured to process data according to the fieldbus protocol, in response to finding that the identifier is present.

26. The method as claimed in claim 21, wherein the identifier is inserted into the header of the Ethernet MAC frame.

27. The method as claimed in claim 21, wherein messages with sum frames which are contained in the Ethernet MAC frame and other messages are transmitted in successive time slots of predetermined length.

28. The method as claimed in claim 21, wherein a predetermined sequence of messages with sum frames which are embedded in the Ethernet MAC frame and other messages is complied with.

29. The method as claimed in claim 21, wherein data to be transmitted by the first component is collected in a buffer store, and is transmitted after transmission of the message with the sum frame.

30. The method as claimed in claim 21, wherein, in response to finding that the identifier indicates the presence of sum frame data in the Ethernet MAC frame, a switch device for the first component supplies the sum frame data to a device for reading data that are intended for that component from the sum frame.

31. The method as claimed in claim 30, wherein, in response to finding that the identifier indicates the absence of sum frame data in the Ethernet MAC frame, the switch device causes the data to bypass the device for reading data that are intended for that component from the sum frame.

32. The method as claimed in claim 30, wherein, in response to finding that the identifier indicates the absence of sum frame data in the Ethernet MAC frame but indicates the definition of the frame data for this component, the switch device supplies the data to a further internal processing device for the first component.

* * * * *